United States Patent Office 3,412,056
Patented Nov. 19, 1968

3,412,056
WATER-SOLUBLE ALKYD RESINS
Raymond V. Crawford, Greasby, Alan G. Roberts, Wallasey, and Patrick A. Toseland, Woolton, England, assignors to J. Bibby & Sons Limited, Liverpool, England, a British company
No Drawing. Filed Sept. 13, 1963, Ser. No. 308,686
Claims priority, application Great Britain, Sept. 21, 1962, 35,930/62
5 Claims. (Cl. 260—22)

This invention is concerned with improvements in or relating to the preparation of water-soluble alkyd resins.

According to the invention there is provided a method of preparing a water-soluble alkyd resin which comprises heating to an elevated temperature, e.g., 160° C. or higher, a mixture of polyhydric alcohol and the tribasic Diels-Alder adduct prepared by reaction of a dienophile containing two acid groups or an anhydride group with a polyunsaturated acid or ester containing a conjugated trans/trans diethenoid system.

The term "water-soluble alkyd resin" is used in this specification to define a resin which contains free carboxyl groups enabling it to be dissolved in an aqueous solution of a water-soluble base such as ammonia or an amine.

The reactants may also include a dibasic acid or anhydride. This acid or anhydride may be of the aliphatic or aromatic series and preferably in the aliphatic series should be of relatively low molecular weight for example adipic acid, fumaric acid or succinic acid. The proposed aromatic compounds are phthalic anhydride or isophthalic acid.

The reactants may further include a monobasic acid for example a saturated or unsaturated fatty acid. Suitably the amount of said monobasic acid should not exceed 50% by weight of the reaction mixture.

The Diels-Alder adducts used in the reaction may be prepared as described in our British Patent No. 1,032,363, e.g., the Diels-Alder adduct of maleic anhydride with conjugated soyabean oil fatty acids. Crude adducts prepared as described in said patent contain unreacted fatty acids and such crude preparations may be used in the process of the present invention thereby providing a reaction mixture containing a monobasic acid. Thus for example a crude product containing 60–70% by weight of adduct and 30–40% of unreacted fatty acid may be employed.

The preferred polyhydric alcohol component is propylene glycol, ethylene glycol or glycerol but other polyhydric alcohols which may be used are pentaerythritol, polyglycerol, sorbitol and mannitol. Where the functionality of the polyhydric alcohol is high the functionality of the acid components of the reaction mixture will be adjusted appropriately.

The reactants as stated above are heated together under conditions which permit formation of polyesters, suitable conditions being those normally used in the manufacture of alkyd resins. The reaction may be carried out, for example, by a fusion cook or by the solvent technique using an azeotropic solvent, e.g., xylene. The order of addition of the reactants is not critical as regards formation of the water-soluble alkyd resin so that all reactants may be mixed together and heated or the reaction can be carried out in stages at which various reactants may be added in whole or in part. The reaction may if desired be carried out in the presence of a catalyst, esterification catalysts, for example sodium hydroxide and tin salts being particularly suitable. In those reactions where the tribasic adduct is prepared from esters rather than acids, it is preferred to use an alcoholysis catalyst, for example sodium hydroxide, magnesium oxide or litharge.

The reaction is preferably continued until an acid value is obtained between 50 and 100 and this usually takes up to 8 hrs. at 170–180° C. although other temperatures may also be used. When adducts of maleic anhydride with conjugated fatty acids are used it is important that the adduct should be relatively free from polybasic acid by-products which can cause the reaction mixture to gel within an hour or so and before the acid value has been reduced sufficiently. The process described in our British Patent No. 1,032,363 provides a method for avoiding the formation of such by-products and subsequent gelation in the manufacture of the alkyd resin.

The alkyd resin produced according to this invention can be cooled at the end of the reaction to, say 80° C. and then dissolved in an aqueous solution of a volatile base, for example, ammonia or an amine, present in sufficient amount to neutralise the free acid groups in the resin, to give a clear solution, pH 8–9, which can be diluted with water. Small amounts of alcohols, for example tertiary butanol, may be used to replace part of the water used as solvent. Such replacement results in aqueous solutions of lower viscosity at higher solids contents.

The aqueous solution of resin at, say, 40% solids content when coated onto metal panels and stoved at 200° C. cures by loss of volatile base and further condensation of free carboxyl and hydroxyl groups. A glossy, flexible coating is obtained. Lower stoving temperatures can be achieved and improved hardness can be obtained in the final film by incorporating a water-soluble melamine resin as a curing agent.

The invention will be illustrated by reference to the following examples of the preparation of water-soluble alkyd resins.

EXAMPLE 1

223 g. of maleic anhydride adduct, in the form of a white powder separated by crystallisation from the reaction product of maleic anhydride with conjugated soyabean oil fatty acids and containing about 3% of monobasic fatty acids, was mixed with 28 g. phthalic anhydride and 99 g. propylene glycol in a flask fitted with stirrer, thermometer and inert gas purge. The temperature was raised to 180° C. and maintained at this level for 7 hours when the acid value had fallen to 64. The reaction product was a pale, viscous resin and was in the class of water-soluble resins as already defined.

10% aqueous ammonia solution was added to the resin, at 75° C., in sufficient amount to neutralise the acidity. Water was added to the clear aqueous solution to adjust the content of non-volatile matter to 50% and a film was cast on a steel panel. The coating was stoved at 200° C. for 30 minutes to give a hard flexible finish.

EXAMPLE 2

206 g. of maleic anhydride adduct which consisted of the residue left after distilling monobasic acids from the reaction product of maleic anhydride with conjugated soyabean oil fatty acids and which contained about 10% monobasic acids was heated with 54 g. phthalic anhydride and 89 g. ethylene glycol at 175° C. for 3 hours. The resulting product was a highly viscous homogeneous liquid having an acid value of 80 and in the class of water-soluble resins.

The alkyd resin was dissolved in a solution of 2-dimethyl-aminoethanol in aqueous butanol (containing 15% butanol) to give a 40% resin solution of pH 8–9. Hexamethoxy methylmelamine was added at a level of 25% based on the alkyd resin content and the aqueous resin solution was coated onto a steel panel and stoved at 150° C. for 30 minutes to give a hard film with good gloss. The aqueous solution was stable on storage.

EXAMPLE 3

206 g. of the maleic anhydride adduct used in Example 2 was heated with 60 g. phthalic anhydride and 90 g. propylene glycol under similar conditions to those described in Example 1 until the reaction product had an acid value of 75.

A 40% aqueous solution of the alkyd was prepared and hexamethoxy methyl melamine was added as in Example 2. A hard glossy coating was obtained by stoving a film of the aqueous solution at 150° C. for 30 minutes.

EXAMPLE 4

512 g. of the reaction product of conjugated soyabean acids with maleic anhydride consisting of about 70% adduct and 30% monobasic acid was heated for 5 hours at 177° C. with 150 g. propylene glycol and 38 g. phthalic anhydride. The final product had an acid value of 52 and was dissolved in aqueous solution as in Example 3. When mixed with hexamethoxymethyl melamine and stoved for 30 minutes at 150° C. a film was obtained which was somewhat softer than that of Example 3.

EXAMPLE 5

204 grams of maleic anhydride adduct which consisted of the residue left after distilling monobasic acids from the reaction product of maleic anhydride with conjugated soyabean fatty acid was heated with 21 grams succinic acid and 90 grams propylene glycol under nitrogen at 170–180° C. for 4½ hours. The product had an acid value of 56 and on solution in aqueous amine and mixing with a melamine resin gave a water soluble resin that had good wetting properties and stoved to a hard glossy film at 150° C.

EXAMPLE 6

204 grams of the maleic anhydride adduct used in Example 5 was heated at 175–180° C. for 4½ hours with 20 grams fumaric acid and 90 grams propylene glycol. During this time 17.5 grams of water was removed and the product had an acid value of 58. A 40% solution of the resin in aqueous base stoved to a hard glossy film with good adhesion when 10% hexamethoxymethylmelamine based on the resin was incorporated into the formulation.

EXAMPLE 7

204 grams of the maleic anhydride adduct used in Example 2 was heated with 26 grams of phthalic anhydride and 90 grams of propylene glycol under similar conditions to those described in Example 1 until the reaction product had an acid value of 75.

A 50% aqueous solution of the resin was prepared and hexamethoxymethylmelamine was added as in Example 2. A hard glossy coating was obtained by stoving a film of the solution at 150° C. for 30 minutes.

In each of the above examples the Diels-Alder adduct contained three carboxyl groups in the free form or in the anhydride form.

EXAMPLE 8

236 grams of the maleic anhydride adduct of conjugated soyabean fatty methyl esters was heated to 100° C. with 0.035 gram of litharge with stirring and 85 grams ethylene glycol and 29 grams of phthalic anhydride added. The mixture was slowly heated to 175–180° C. under a steam condenser with agitation and held at this temperature for 5 hours. 25 mls. of a mixture of water and methanol was removed during this time and the final acid value was 62. The product was dissolved in an aqueous solution containing 8.3% dimethylaminoethanol and 21.2% tertiary butanol to give a 40% non-volatile content. The solution was used to coat steel plates and after stoving for 30 minutes at 150° C. and then 2 hours at 180° C. gave hard glossy films. Addition of 10% hexamethoxymethylmelamine to the aqueous solution gave a resin that could be stoved in 30 minutes at 150° C. to a hard glossy film.

In the above example the Diels-Alder adduct contained three carboxyl groups, two in the anhydride form and one in the form of a methyl ester.

EXAMPLE 9

294 grams of the maleic anhydride adduct used in Example 2 was heated with 106 grams of propylene glycol under conditions similar to those described in Example 1 until the reaction product had an acid value of 67. A 50% aqueous solution of the alkyl was prepared using dimethylaminoethanol as the aqueous base and melamine was added as in Example 2. A hard glossy coating was obtained by stoving a film of the aqueous solution at 150° C. for 30 minutes.

Satisfactory results have been obtained in the production of water-soluble alkyd resins in accordance with the present invention when the overall functionality of the reactants lies between 2 and 2.4, when the amount of tribasic Diels-Alder adduct is below 75% by weight of the reactants and also when the ratio of carboxyl groups to hydroxyl groups in the reaction mixture is between 0.7:1 and 1.3:1.

We claim:

1. A method of preparing a water-soluble alkyl resin which comprises partially esterifying with a polyhydric alcohol at an alkyd resin forming temperature of at least 160° C., a tri-carboxylic acid which is a Diels-Alder adduct prepared by reaction of a dibasic dienophil with a substance selected from the group consisting of conjugated polysaturated fatty acids and lower alkyl esters thereof, the dienophil being present in an amount substantially equivalent to the conjugated diene content of the fatty acid compound, said polyunsaturated compounds containing a conjugated trans-trans diethenoid system until the reaction product has an acid value of between 50 and 100.

2. A method in accordance with claim 1 wherein the reaction product is cooled and dissolved in an aqueous solution of a volatile base in sufficient amount to neutralise the free acid groups of the reaction product.

3. A method in accordance with claim 1 wherein the reaction product is cooled and dissolved in an aqueous solution of a volatile base containing a small amount of a lower alkyl alcohol, said base being present in sufficient amount to neutralise the free acid groups of the reaction product.

4. A water-soluble alkyd resin obtained by the process of claim 1.

5. A solution of the water-soluble alkyd resin in an aqueous solution of a volatile base obtained by the process of claim 3.

References Cited

UNITED STATES PATENTS

| 2,312,731 | 3/1943 | Salathiel | 252—342 |
| 2,414,712 | 1/1947 | Bolley | 260—405 |
| 2,456,629 | 12/1948 | Gehrenbeck | 260—22 |
| 2,586,385 | 2/1952 | Runk | 260—19 |
| 2,909,496 | 10/1959 | Cooke et al. | 260—22 |
| 2,941,968 | 1/1960 | McKenna | 260—23 |
| 3,055,869 | 9/1962 | Wilson et al. | 260—22 |
| 3,057,824 | 10/1962 | Le Bras et al. | 260—22 |
| 3,253,938 | 5/1966 | Hunt | 260—18 |
| 2,146,671 | 2/1939 | Ellis | 260—22 |
| 2,760,968 | 8/1956 | Pack et al. | 260—405.6 |

DONALD E. CZAJA, Primary Examiner.

R. W. GRIFFIN Assistant Examiner.